(12) United States Patent  (10) Patent No.: US 8,087,486 B2
Yamamuro  (45) Date of Patent: Jan. 3, 2012

(54) VEHICULAR CANISTER MOUNTING STRUCTURE

(75) Inventor: Shiro Yamamuro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 435 days.

(21) Appl. No.: 12/498,524

(22) Filed: Jul. 7, 2009

(65) Prior Publication Data

US 2010/0001031 A1 Jan. 7, 2010

(30) Foreign Application Priority Data

Jul. 7, 2008 (JP) ................................ 2008-177034

(51) Int. Cl.
*B60K 11/04* (2006.01)

(52) U.S. Cl. .................................................. 180/68.4

(58) Field of Classification Search .............. 280/834, 280/835; 180/68.4, 68.6, 69.4; 248/56, 58, 248/62, 65, 73
See application file for complete search history.

(56) References Cited

U.S. PATENT DOCUMENTS

| 4,369,981 | A  | * | 1/1983 | Chiba et al. | .................. | 280/834 |
| 6,105,708 | A  | * | 8/2000 | Amano et al. | ................ | 180/309 |
| 7,905,503 | B2 | * | 3/2011 | Goto et al. | ............ | 280/124.109 |
| 7,975,675 | B2 | * | 7/2011 | Menke | .......................... | 123/519 |

FOREIGN PATENT DOCUMENTS

| JP | 63-145125 | 6/1988 |
| JP | 10-175568 | 6/1998 |
| JP | 2006-160044 | 6/2006 |
| JP | 2007-162539 | 6/2007 |

* cited by examiner

*Primary Examiner* — Faye M. Fleming

(74) *Attorney, Agent, or Firm* — Rankin, Hill & Clark LLP

(57) ABSTRACT

A vehicular canister mounting structure includes a vehicle body floor provided on rear frames, a canister being provided underneath the vehicle body floor for treating gasoline vapor produced within a fuel tank, a guide pipe for protecting the canister, and a support for supporting the guide pipe and the canister on a vehicle body. The support includes a guide pipe bracket welded to the vehicle body floor for supporting the guide pipe, and a canister bracket welded to the guide pipe bracket for supporting the canister. Strength with which the canister bracket is welded to the guide pipe bracket is smaller than a strength with which the guide pipe bracket is welded to the vehicle body floor.

4 Claims, 7 Drawing Sheets

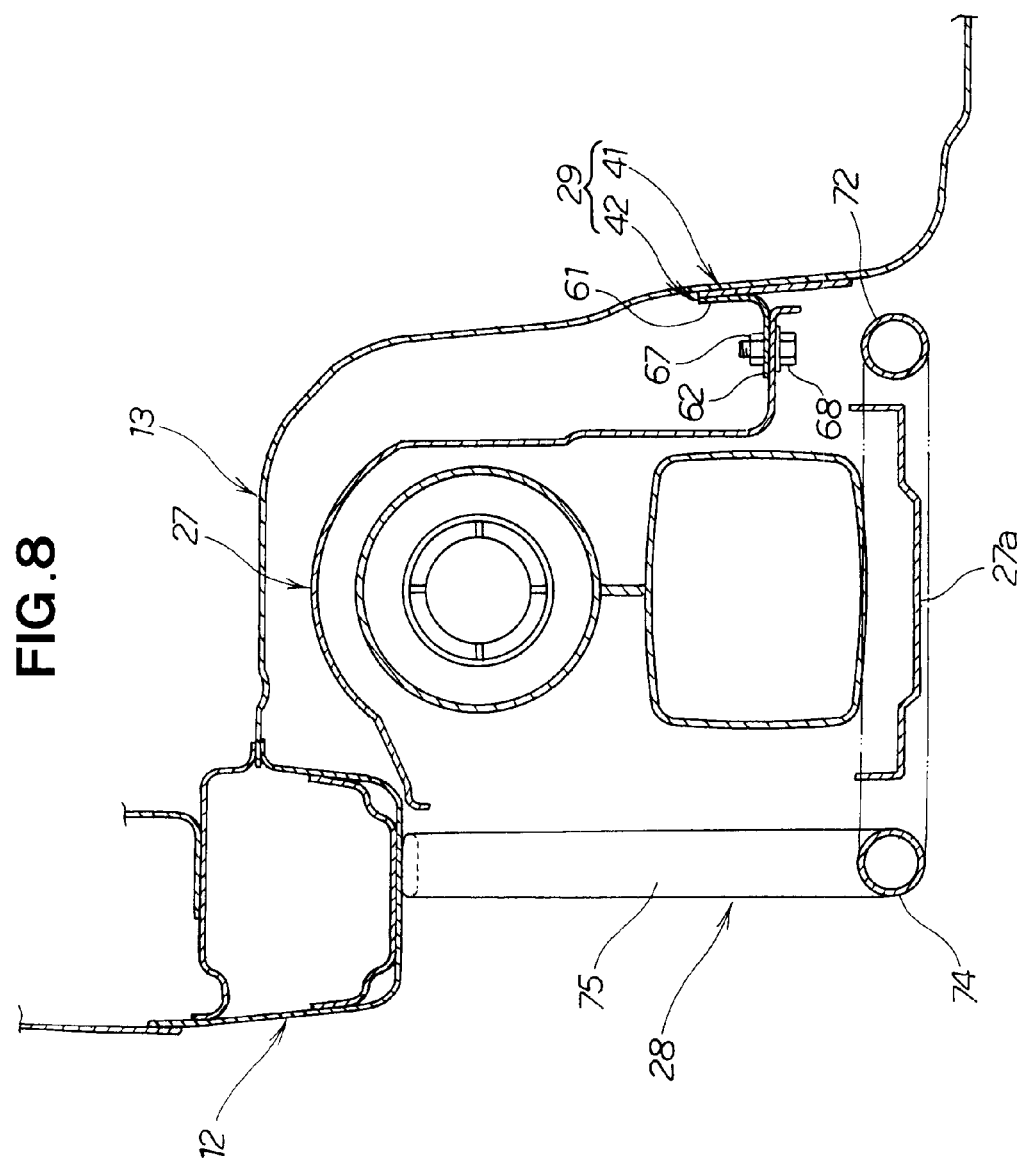

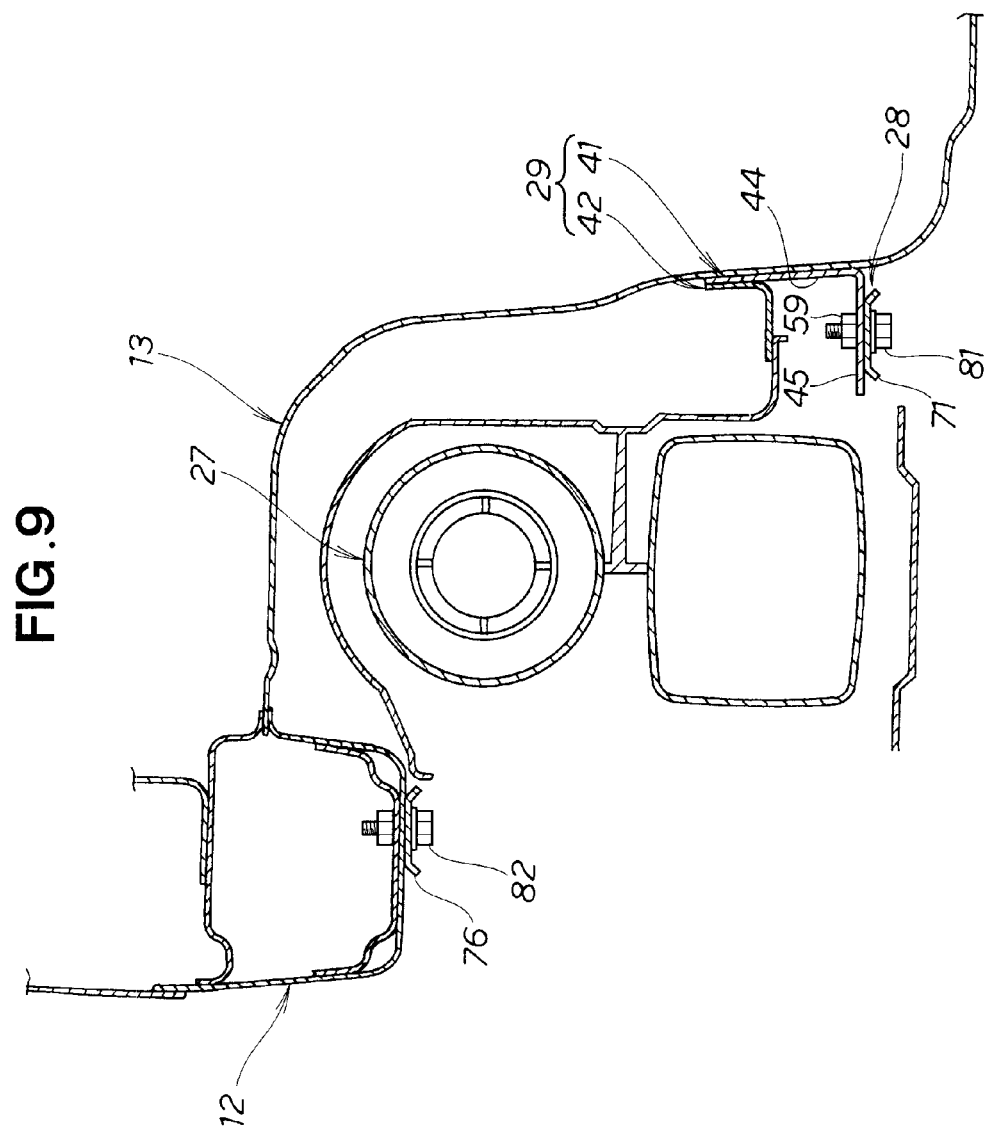

VEHICULAR CANISTER MOUNTING STRUCTURE

FIELD OF THE INVENTION

The present invention relates to structures for mounting a vehicular canister that treats gasoline vapor produced within a fuel tank.

BACKGROUND OF THE INVENTION

Among the conventionally-known structures for mounting a vehicular canister (i.e., vehicular-canister mounting structures) are ones where a fuel tank is disposed underneath a vehicle body floor and a vehicular canister is mounted on a vehicle body framework member disposed underneath the vehicle body floor. It has been conventional to provide the vehicular-canister mounting structures of this type in proximity to the fuel tank with a view to efficiently treating gasoline vapor produced within the fuel tank.

Japanese patent application Laid-Open Publication No. 2006-160044 discloses one example of such vehicular-canister mounting structures, where the vehicular canister is disposed behind the fuel tank. More specifically, the vehicular-canister mounting structure disclosed in the 2006-160044 publication includes: the fuel tank disposed underneath the vehicle body floor; the vehicular canister (hereinafter sometimes referred to as "canister") disposed behind and in proximity to the fuel tank and fixed to the underside of a cross member; a sub frame provided underneath the canister; and a rear frame provided behind the canister.

However, with the vehicular-canister mounting structure disclosed in the 2006-160044 publication, where the canister is fixed to the underside of the cross member, the canister can not be moved in a front-rear direction of the vehicle body when the vehicle has had a rear-end collision with another vehicle or object. Further, because the vehicular canister is disposed behind and in proximity to the fuel tank in the vehicular-canister mounting structure disclosed in the No. 2006-160044 publication, the canister has nowhere to escape to when the vehicle has had a rear-end collision.

SUMMARY OF THE INVENTION

In view of the foregoing prior art problems, it is an object of the present invention to provide an improved vehicular canister mounting structure which not only can sufficiently protect the canister until a predetermined load is applied to the vehicle, but also allows the canister to escape appropriately when a load exceeding a predetermined amount acts on the vehicle body.

In order to accomplish the above-mentioned object, the present invention provides an improved vehicular canister mounting structure, which comprises: a vehicle body floor disposed on left and right rear frames, a canister being disposed underneath the vehicle body floor for treating gasoline vapor produced within a fuel tank; a guide pipe for protecting the canister; and a support for supporting the guide pipe and the canister on a vehicle body, the support including: a guide pipe bracket welded to the vehicle body floor for supporting the guide pipe; and a canister bracket welded to the guide pipe bracket for supporting the canister, a strength with which the canister bracket is welded to the guide pipe bracket being smaller than a strength with which the guide pipe bracket is welded to the vehicle body floor.

According to the present invention, the strength with which the canister bracket is welded to the guide pipe bracket is smaller than the strength with which the guide pipe bracket is welded to the vehicle body floor. Thus, at the time of a rear-end collision, the canister bracket is detached from the guide pipe bracket so that a collision stroke can be secured. As a consequence, the present invention can prevent the canister from collapsing due to the rear-end collision. When the vehicle has collided, for example, against a curb during normal use or operation of the vehicle, a sufficient strength of the guide pipe bracket can be secured because the guide pipe bracket is strongly fixed to the vehicle body floor, and thus, the canister can be reliably protected by the guide pipe attached to the guide pipe bracket.

Namely, the present invention can sufficiently protect the canister until a predetermined load is applied to the vehicle body, and it allows the canister to move or escape when a load exceeding a predetermined load acts on the vehicle body.

Further, because the canister and the guide pipe can be mounted together as a unit to the vehicle body floor, the canister and the guide pipe can be mounted with an enhanced efficiency and reliability.

In an embodiment, the guide pipe bracket is welded to the vehicle body floor by spot welding, and the canister bracket is welded to the guide pipe bracket by spot welding, and the number of spot welded portions at which the canister bracket is welded to the guide pipe bracket is smaller than the number of spot welded portions at which the guide pipe bracket is welded to the vehicle body floor. Thus, at the time of a rear-end collision, the canister bracket is detached from the guide pipe bracket so that a collision stroke can be secured to allow the canister to move or escape by an appropriate amount. As a consequence, it is possible to prevent the canister from collapsing due to the rear-end collision.

In an embodiment, the guide pipe is provided to surround the lower surface of the canister. This arrangement can reliably protect the canister from curbs etc.

In an embodiment, the guide pipe includes: a one-end mounting section mounted to the guide pipe bracket; a first front-to-rear horizontal section extending rearward from the one-end mounting section to surround a lower surface of one side portion of the canister; a rear horizontal section bent from the first front-to-rear horizontal section toward the canister to surround a rear lower surface of the canister; a second front-to-rear horizontal section bent from the rear horizontal section toward the canister to surround a lower surface of an other side portion of the canister; a vertical section bent upward from the second front-to-rear horizontal section to vertically extend along the other side portion of the canister; an other-end mounting section bent forward from the vertical section to be mounted to one of the rear frames. With this arrangement, the guide pipe has a sufficient strength to appropriately protect the canister from curbs located behind and laterally of the vehicle.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 8 is a sectional view taken along line 8-8 of FIG. 1; and

FIG. 9 is a sectional view taken along line 9-9 of FIG. 1.

DETAILED DESCRIPTION OF THE PREFERRED EMBODIMENTS

Figure 1:
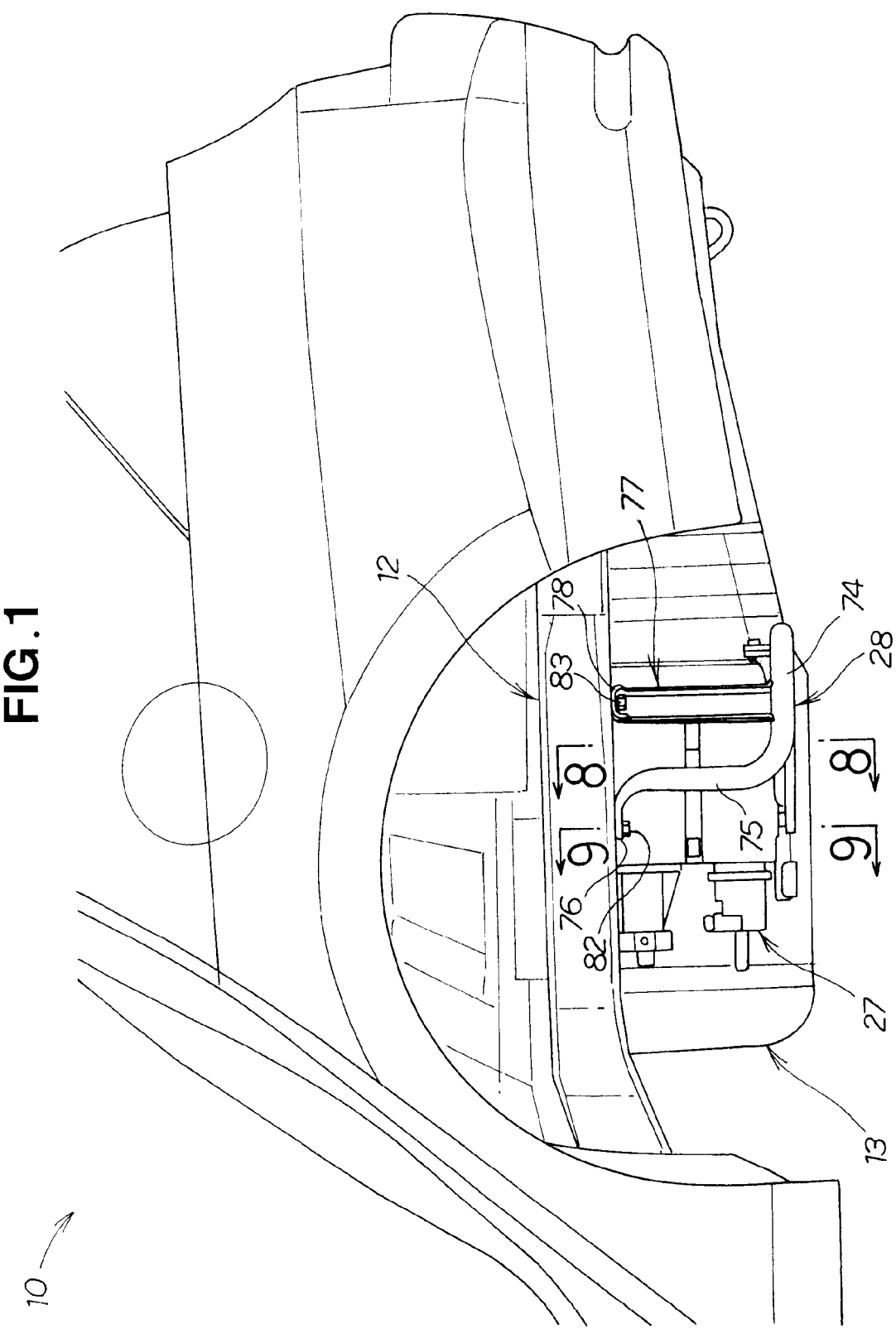
FIG. 1 is a left side view of a vehicle where is employed a mounting structure for a vehicular canister according to an embodiment of the present invention.
Figure 2:
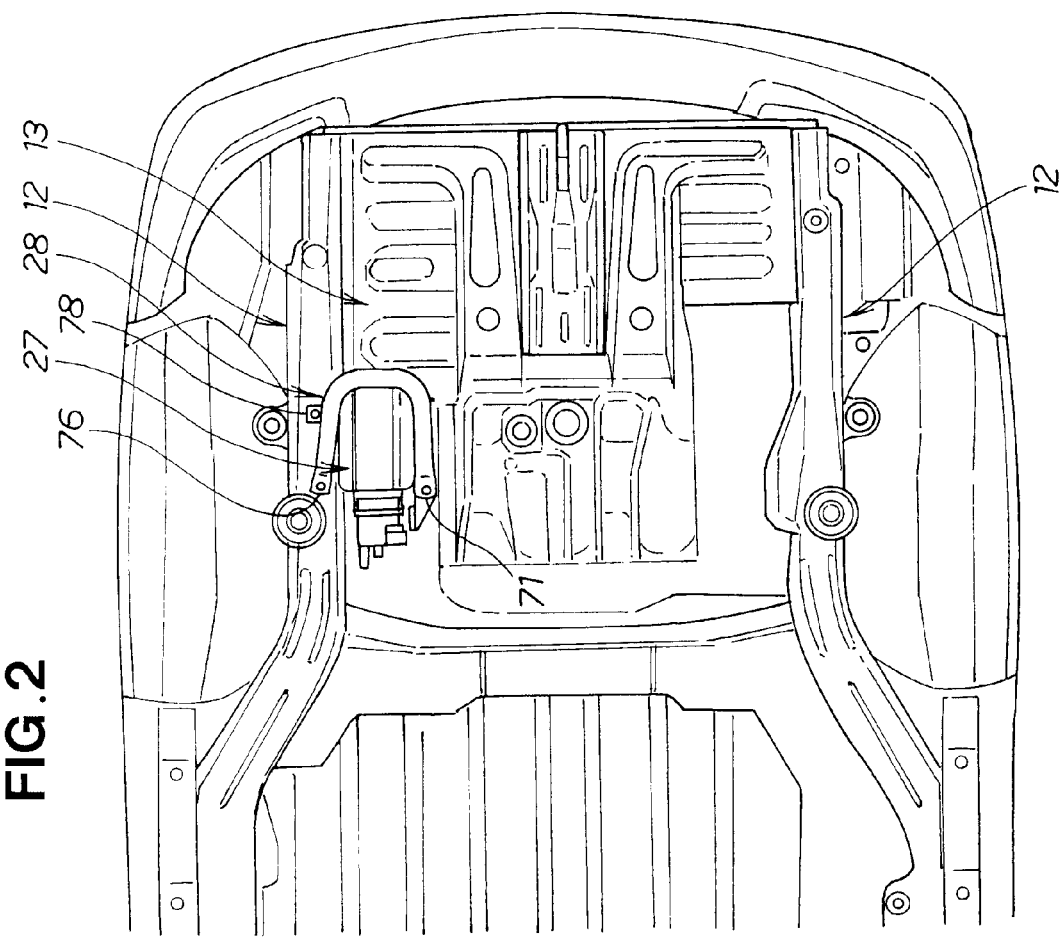
FIG. 2 is a bottom view of the vehicle employing the vehicular canister mounting structure shown in FIG. 1.

Reference is now made to FIG. 1 which is a left side view of a vehicle where is employed a mounting structure for a vehicular canister (hereinafter referred to as "vehicular canister mounting structure") according to an embodiment of the present invention, and to FIG. 2 which is a bottom view of the vehicle employing the vehicular canister mounting structure shown in FIG. 1. The vehicle 10 includes left and right rear frames 12 extending in a front-rear direction of the vehicle body, a vehicle body floor (floor panel) 13 disposed on and between the rear frames 12, and a vehicular canister (hereinafter referred to as "canister") 27 disposed underneath the vehicle body floor 13 for treating gasoline vapor produced within a fuel tank (not shown).

Figure 3:
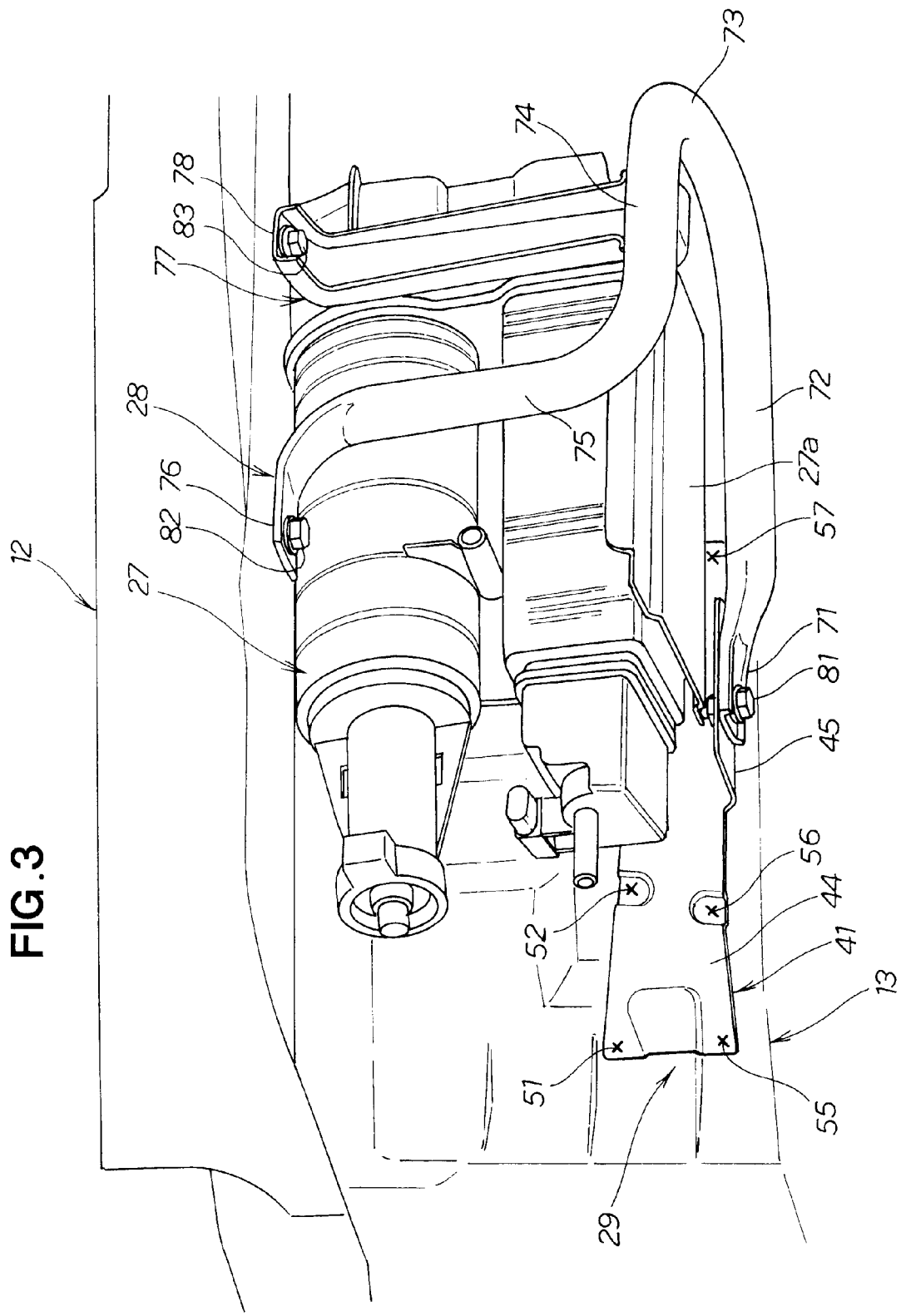
FIG. 3 is a perspective view of the vehicular canister mounting structure shown in FIG. 1.
Figure 4:
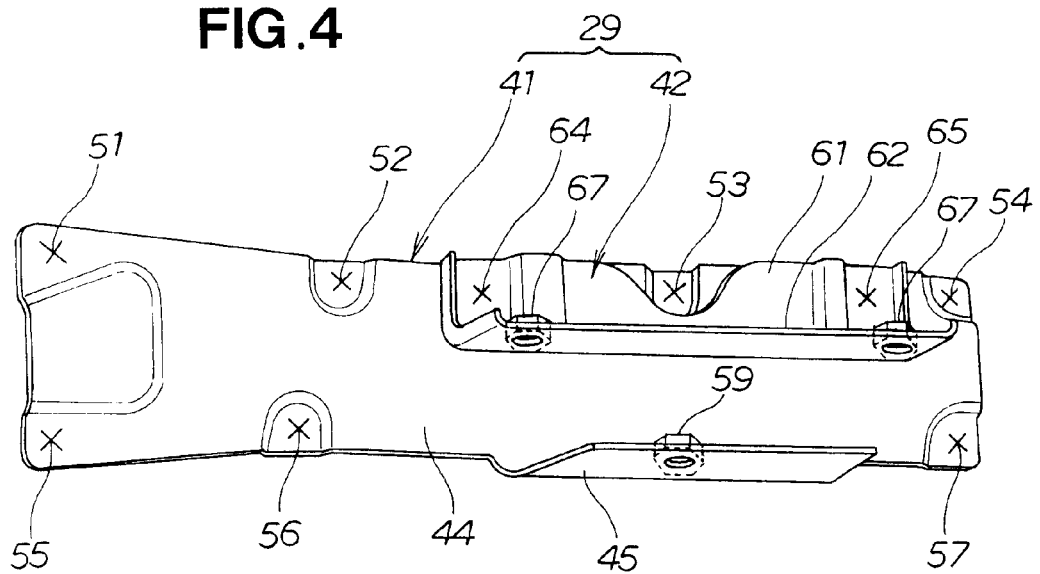
FIG. 4 is a perspective view of a canister support employed in the vehicular canister mounting structure shown in FIG. 1.

FIG. 3 is a perspective view of the vehicular canister mounting structure shown in FIG. 1, and FIG. 4 is a perspective view of a canister support employed in the vehicular canister mounting structure shown in FIG. 1. The instant embodiment of the vehicular canister mounting structure includes a guide pipe 28 for protecting the canister 27, and the canister support 29 for supporting the canister 27 and guide pipe 28 on the vehicle body.

The support 29 includes a guide pipe bracket 41 welded to the vehicle body floor 13 for supporting the guide pipe 28, and a canister bracket 42 welded to the guide pipe bracket 41 for supporting the canister 27.

As shown in FIG. 4, the guide pipe bracket 41 is a bracket of a substantially L shape, which includes a vehicle-body-side mounting section 44 fixedly mounted to the vehicle body floor 13, and a guide pipe mounting section 45 bent from the vehicle-body-side mounting section 44 in such a manner as to define a substantially L profile with the vehicle-body-side mounting section 44. The vehicle-body-side mounting section 44 has spot welded portions 51-57 at seven points thereon (i.e., the vehicle-body-side mounting section 44 has seven spot welded portions 51-57), and the guide pipe mounting section 45 has a welding nut 59 for fastening the guide pipe 28 thereto.

The canister bracket 42 is a bracket of a substantially L shape, which includes a bracket-side mounting section 61 fixedly mounted to the guide pipe bracket 41, and a canister mounting section 62 bent from the bracket-side mounting section 61 in such a manner as to define a substantially L profile with the bracket-side mounting section 61. The bracket-side mounting section 61 has spot welded portions 67 at two points thereon (i.e., the bracket-side mounting section 61 has two spot welded portions 64 and 65, and the canister mounting section 62 has welding nuts 67 for fastening the canister 27 thereto.

The canister 27 is fastened to the canister mounting section 62 of the canister bracket 42 by means of bolts 68 (only one of which is shown in FIG. 8).

Figure 5:
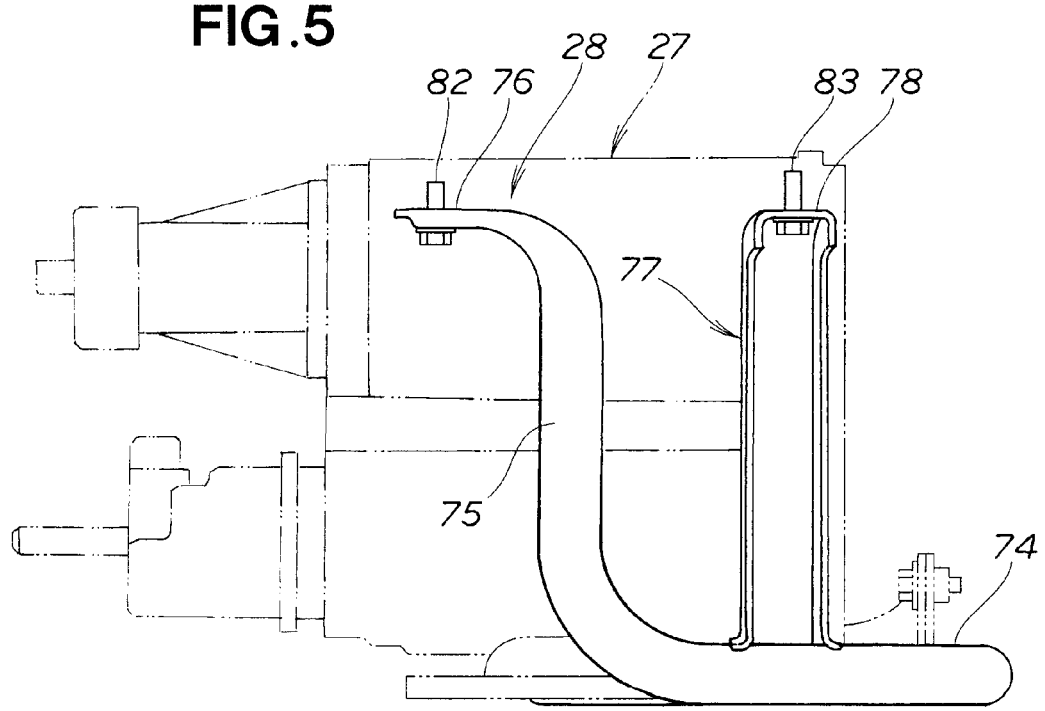
FIG. 5 is a side view of a guide pipe employed in the vehicular canister mounting structure shown in FIG. 1.
Figure 6:
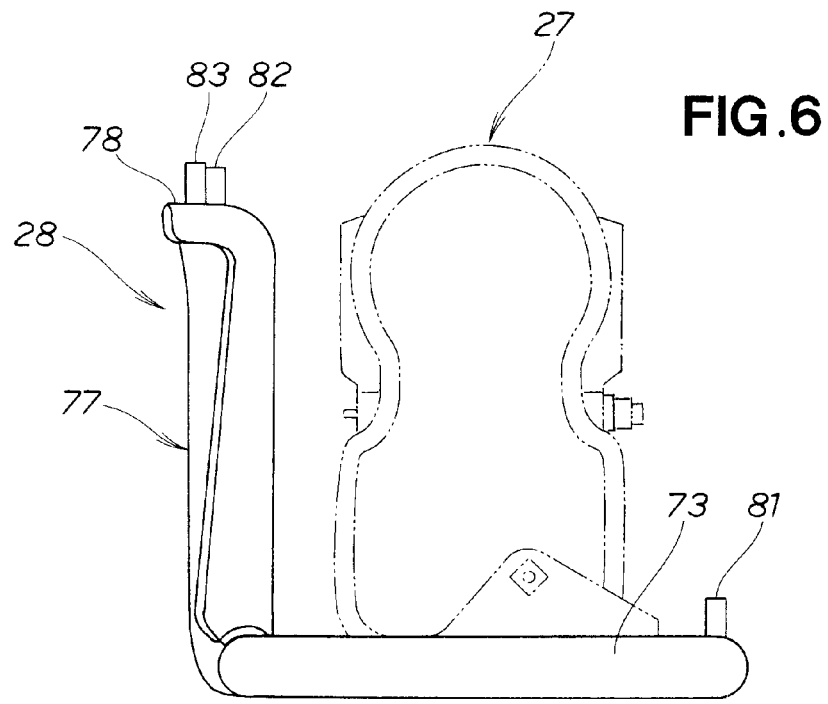
FIG. 6 is a rear view of the guide pipe employed in the vehicular canister mounting structure shown in FIG. 1.
Figure 7:
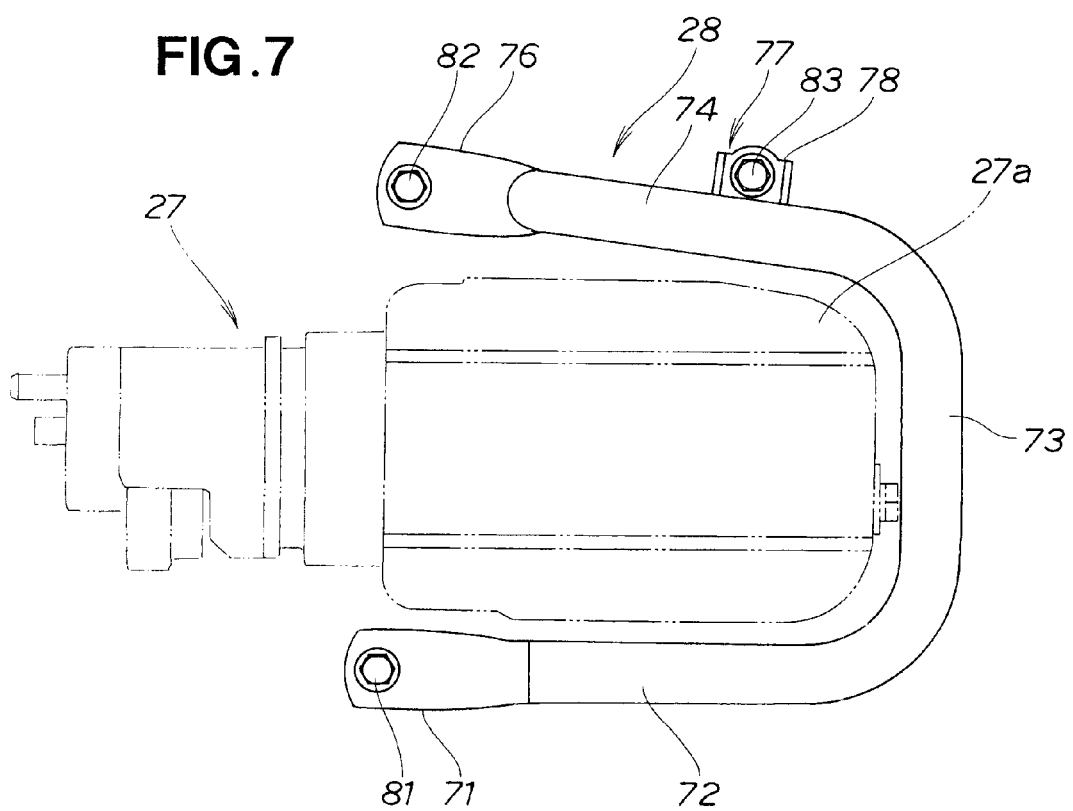
FIG. 7 is a bottom view of the guide pipe employed in the vehicular canister mounting structure shown in FIG. 1.

FIG. 5 is a side view of the vehicular canister mounting structure shown in FIG. 1, and FIG. 6 is a rear view of the vehicular canister mounting structure shown in FIG. 1. Further, FIG. 7 is a bottom view of the guide pipe in the vehicular canister mounting structure shown in FIG. 1, FIG. 8 is a sectional view taken along line 8-8 of FIG. 1, and FIG. 9 is a sectional view taken along line 9-9 of FIG. 1.

The guide pipe 28 includes: a one-end mounting section 71 mounted to the guide pipe bracket 41; a first front-to-rear horizontal section 72 extending rearward from the one-end mounting section 71 to surround the lower surface of one side portion of the canister 27; a rear horizontal section 73 bent from the first front-to-rear horizontal section 72 toward the canister 27 to surround the rear lower surface of the canister 27; a second front-to-rear horizontal section 74 bent from the rear horizontal section 73 toward the canister 27 to surround the lower surface of an other side portion, opposite from the one side portion, of the canister 27; a vertical section 75 bent upward from the second front-to-rear horizontal section 74 to extend vertically along the other side portion of the canister 27; an other-end mounting section 76 bent forward from the vertical section 75 to be mounted to the left rear frame 12; and a stay member 77 welded at one end to an upper portion of the second front-to-rear horizontal section 74 and connected at the other end to the rear frame 12.

The stay member 77 has a stay-side mounting section 78 formed at its other end portion for connection to the rear frame 12. The one-end mounting section 71 is fastened to the vehicle body floor 13 by means of a bolt 81, the other-end mounting section 76 is fastened to the rear frame 12 by means of a bolt 82, and the stay-side mounting section 78 is fastened to the rear frame 12 by means of a bolt 83.

As set forth above in relation to FIGS. 1-4, the instant embodiment of the vehicular canister mounting structure comprises: the vehicle body floor 13 disposed on the rear frames 12, the canister 27 being disposed underneath the vehicle body floor 13 for treating gasoline vapor produced within the fuel tank; the guide pipe 28 for protecting the canister 27; and the support 29 for supporting the guide pipe 28 and the canister 27 on the vehicle body.

Strength with which the canister bracket 42 is welded to the guide pipe bracket 41 is smaller than a strength with which the guide pipe bracket 41 is welded to the vehicle body floor 13; that is, the welded strength of the canister bracket 42 is smaller than the welded strength of the guide pipe bracket 41. Thus, at the time of a rear-end collision, the canister bracket 42 will be detached from the guide pipe bracket 41 so that a collision stroke can be secured and thus the canister 27 is allowed to move or escape forward. As a consequence, it is possible to prevent the canister 27 from collapsing due to the rear-end collision. Further, when the vehicle has collided, for example, against a curb during normal use or operation of the vehicle, a sufficient strength of the guide pipe bracket 41 can be secured because the guide pipe bracket 41 is strongly fixed to the canister 27 can keep a sufficient strength, and thus, the canister 27 can be protected by the guide pipe 28 attached to the guide pipe bracket 41.

Namely, the instant embodiment of the vehicular canister mounting structure can sufficiently protect the canister 27 until a predetermined load is applied to the vehicle body, and it allows the canister 27 to escape forward when a load exceeding the predetermined load acts on the vehicle body.

Further, because the canister 27 and the guide pipe 28 can be mounted together as a unit to the vehicle body floor, the instant embodiment of the vehicular canister mounting structure allows the canister 27 and the guide pipe 28 to be mounted with an enhanced efficiency and reliability.

Further, in the support 29, as described above with particular reference to FIG. 4, the number of the spot welded portions 64 and 65 of the canister bracket 42 is smaller than the number of the spot welded portions 51-57 of the guide pipe bracket 41. Thus, at the time of a rear-end collision, the canister bracket 42 will be detached from the guide pipe bracket 41 so that a collision stroke can be secured to prevent the canister 27 from undesirably collapsing due to the rear-end collision.

Further, in the guide pipe 28, as shown in FIGS. 5-9, the guide pipe 28 is provided to surround the lower surface 27a of the canister 27. Thus, the canister 27 can be protected from a curd etc, by means of the guide pipe 28.

Namely, because the guide pipe 28 includes the one-end mounting section 71 mounted to the guide pipe bracket 41, the first front-to-rear horizontal section 72 extending rearward from the one-end mounting section 71 to surround the lower surface of one side portion of the canister 27, the rear horizontal section 73 bent from the first front-to-rear horizontal section 72 toward the canister 27 to surround the rear lower surface of the canister 27, the second front-to-rear horizontal section 74 bent from the rear horizontal section 73 toward the canister 27 to surround the lower surface of the other side portion, opposite from the one side portion, of the canister 27, the vertical section 75 bent upward from the second front-to-rear horizontal section 74 to extend along the other side portion of the canister 27, and the another-end mounting section 76 bent forward from the vertical section 75 and mounted to the left rear frame 12, it has a sufficient mechanical strength and rigidity to reliably protect the canister 27 from curbs located behind and laterally of the vehicle.

Furthermore, because the guide pipe 28 includes the stay member 77 welded at one end to the upper portion of the second front-to-rear horizontal section 74 and connected at the other end to the rear frame 12, the guide pipe 28 can have an increased rigidity, so that the canister 27 can be reliably protected from curbs located behind and laterally of the vehicle.

Whereas the instant embodiment of the vehicular canister mounting structure has been described above as having seven spot welded portions 51-57 on the guide pipe bracket 41 and two spot welded portions 64 and 65 on the canister bracket 42, the present invention is not so limited, and any other suitable arrangement may be employed as long as the welded strength of the canister bracket 42 is lower than that of the guide pipe bracket 41.

The vehicular canister mounting structure of the present invention is well suited for application to passenger cars of a second type, wagon type, etc.

Obviously, various minor changes and modifications of the present invention are possible in light of the above teaching. It is therefore to be understood that within the scope of the appended claims the invention may be practiced otherwise than as specifically described.

What is claimed is:

1. A vehicular canister mounting structure comprising:
    a vehicle body floor disposed on left and right rear frames, wherein a canister being disposed underneath the vehicle body floor for treating gasoline vapor produced within a fuel tank;
    a guide pipe for protecting the canister; and
    a support for supporting the guide pipe and the canister on a vehicle body, the support including:
        a guide pipe bracket welded to the vehicle body floor for supporting the guide pipe;
        and a canister bracket welded to the guide pipe bracket for supporting the canister, wherein a strength with which the canister bracket is welded to the guide pipe bracket is smaller than a strength with which the guide pipe bracket is welded to the vehicle body floor.

2. The vehicular canister mounting structure according to claim 1, wherein the guide pipe bracket is welded to the vehicle body floor by spot welding, and the canister bracket is welded to the guide pipe bracket by spot welding, and
    wherein a number of spot welded portions at which the canister bracket is welded to the guide pipe bracket is smaller than a number of spot welded portions at which the guide pipe bracket is welded to the vehicle body floor.

3. The vehicular canister mounting structure according to claim 1, wherein the guide pipe is provided to surround a lower surface of the canister.

4. The vehicular canister mounting structure according to claim 1, wherein the guide pipe includes:
    a one-end mounting section mounted to the guide pipe bracket;
    a first front-to-rear horizontal section extending rearward from the one-end mounting section to surround a lower surface of one side portion of the canister;
    a rear horizontal section bent from the first front-to-rear horizontal section toward the canister to surround a rear lower surface of the canister;
    a second front-to-rear horizontal section bent from the rear horizontal section toward the canister to surround a lower surface of an other side portion of the canister;
    a vertical section bent upward from the second front-to-rear horizontal section to vertically extend along the other side portion of the canister; and
    an other-end mounting section bent forward from the vertical section to be mounted to one of the left and right rear frames.

* * * * *